(12) United States Patent
Ghosh et al.

(10) Patent No.: US 12,143,315 B1
(45) Date of Patent: Nov. 12, 2024

(54) POWER LEVEL REDUCTION BASED ON MAXIMUM BANDWIDTH REQUIREMENT

(71) Applicant: Juniper Networks, Inc., Sunnyvale, CA (US)

(72) Inventors: Sandip Kumar Ghosh, Bangalore (IN); Jameesh Kundanthodika, Bangalore (IN); Lohith H. Nayak, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/325,373

(22) Filed: May 30, 2023

(51) Int. Cl.
*H04L 49/40* (2022.01)

(52) U.S. Cl.
CPC .................. *H04L 49/40* (2013.01)

(58) Field of Classification Search
CPC ....................................... H04L 49/40
See application file for complete search history.

(56) References Cited

U.S. PATENT DOCUMENTS

| | | | | |
|---|---|---|---|---|
| 7,603,574 B1* | 10/2009 | Gyugyi | ............... | H04L 12/12 713/340 |
| 2003/0158609 A1* | 8/2003 | Chiu | ............... | G06F 1/3203 700/22 |
| 2008/0317021 A1* | 12/2008 | Ives | ............... | G06F 11/3006 370/389 |
| 2014/0146676 A1* | 5/2014 | Howes | ............... | H04L 47/2441 370/235 |
| 2014/0146677 A1* | 5/2014 | Howes | ............... | H04L 47/2441 370/235 |
| 2015/0074262 A1* | 3/2015 | Antony | ............... | H04L 45/586 709/224 |
| 2017/0071008 A1* | 3/2017 | Sunay | ............... | H04W 72/21 |
| 2021/0234648 A1* | 7/2021 | Parekh | ............... | H04W 72/04 |
| 2021/0392006 A1* | 12/2021 | Rathinasamy | ............... | G06F 1/266 |
| 2022/0150762 A1* | 5/2022 | Wang | ............... | H04W 72/20 |
| 2022/0244982 A1* | 8/2022 | Vijayvargiya | ............... | H04L 67/148 |
| 2023/0171608 A1* | 6/2023 | Munier | ............... | H04W 64/00 370/328 |

* cited by examiner

*Primary Examiner* — Joe Chacko
(74) *Attorney, Agent, or Firm* — Harrity & Harrity, LLP

(57) ABSTRACT

In some implementations, a network device may determine a maximum bandwidth requirement (MBR) associated with a network device. The network device may reduce based at least in part on the MBR, a power level of a component of the network device.

20 Claims, 8 Drawing Sheets

POWER LEVEL REDUCTION BASED ON MAXIMUM BANDWIDTH REQUIREMENT

BACKGROUND

Power savings, power consumption, and/or power efficiency are differentiators in the routing and switching market. Network devices consume a significant amount of power, which can create large costs to internet service providers (ISPs) and cloud vendors as well as to the environment. Thus, power efficiency is an important consideration in network devices due to high energy prices, global warming, and other factors.

SUMMARY

Some implementations described herein relate to a method. The method may include determining, by a network device, a maximum bandwidth requirement (MBR) associated with a network device. The method may include reducing, by the network device, based at least in part on the MBR, a power level of a component of the network device.

Some implementations described herein relate to a network device. The network device may include one or more memories and one or more processors. The one or more processors may be to determine an MBR associated with the network device. The one or more processors may be to reduce, based at least in part on the MBR, a power level of a component of the network device.

Some implementations described herein relate to a non-transitory computer-readable medium that stores a set of instructions. The set of instructions comprises one or more instructions that, when executed by one or more processors of a network device, may cause the network device to determine an MBR associated with the network device. The one or more instructions, when executed by one or more processors of the network device, may cause the network device to reduce, based at least in part on the MBR, a power level of a component of the network device.

DETAILED DESCRIPTION

Figure 1:
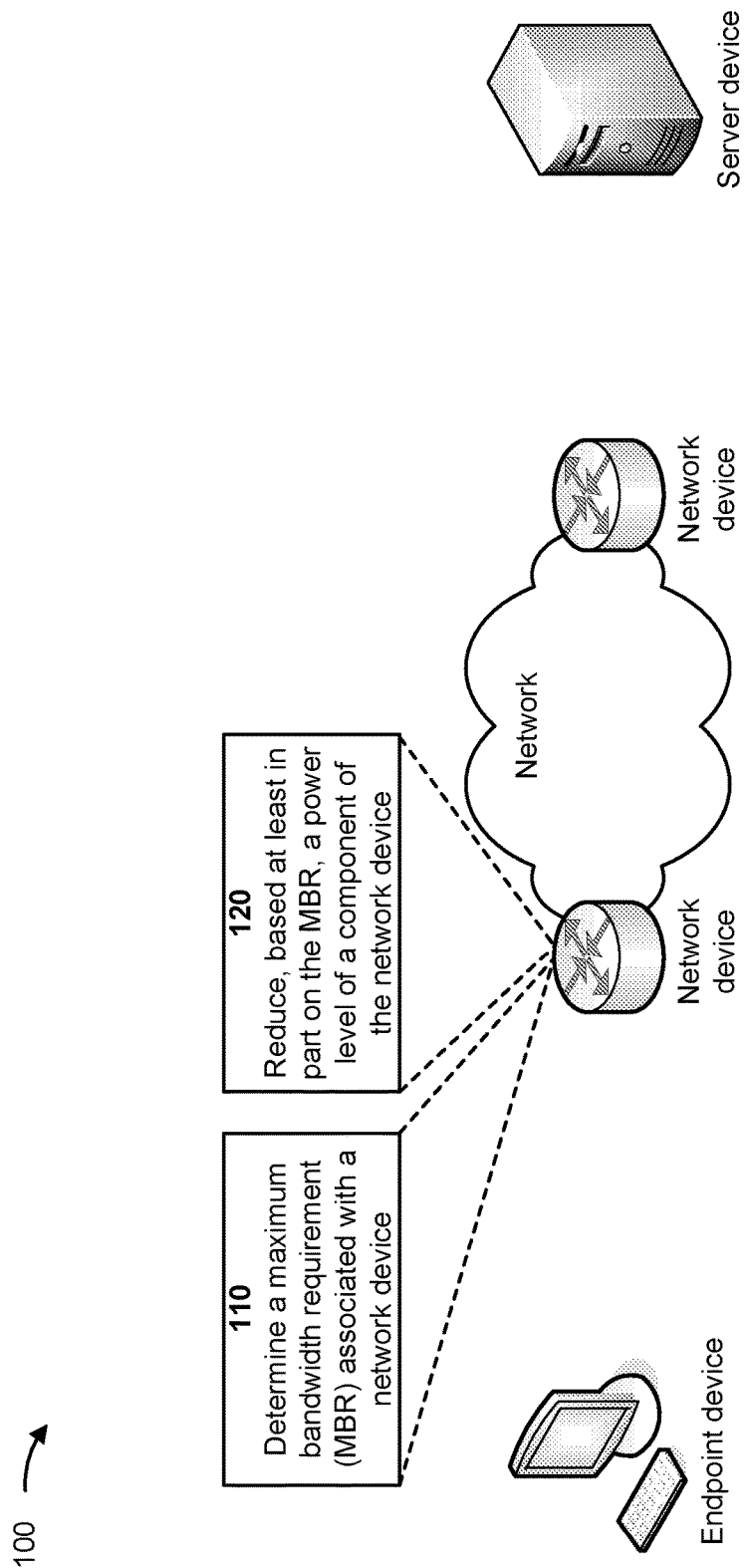
FIG. 1 is a diagram of an example implementation associated with reducing a power level of a component of a network device based at least in part on a maximum bandwidth requirement (MBR) associated with the network device.

The following detailed description of example implementations refers to the accompanying drawings. The same reference numbers in different drawings may identify the same or similar elements.

The maximum bandwidth capability (MBC) of a network device is the maximum traffic processing capability of that network device. For example, the MBC may be determined based on assumptions that (1) all interfaces (e.g., all physical interface devices (IFDs)) of the network device are connected and configured (e.g., running) at the maximum supported speed, and (2) that all interfaces are loaded with 100% line rate traffic (e.g., that all IFDs are forwarding traffic with 100% utilization).

The maximum bandwidth requirement (MBR) of a network device is based at least in part on a dynamic state of the network device. For example, the MBR may be the maximum traffic processing requirement of the network device, which may account for dynamic states of the network device such as the selected (e.g., configured) speed of the interfaces of the network device, interface usage state (e.g., whether optics are inserted, whether an interface (e.g., a logical unit) is configured, or the like). For example, the MBR may be determined based on the status of the interfaces (e.g., IFDs). For example, the MBR may be determined based on assumptions that (1) interfaces (e.g., IFDs) that are not configured (e.g., that are without a configured interface (e.g., a logical unit)) will not forward any traffic, and (2) that interfaces (e.g., IFDs) without optics will not forward traffic. Additionally, or alternatively, the MBR may be determined based on the speed of the interfaces (e.g., IFDs). For example, the MBR may be determined based on an assumption that all ports having an administrator or link status of "UP" may not be configured for the maximum supported port speed. The MBR may be calculated assuming 100% line rate traffic processing.

MBC is different than MBR. In practice, MBC is typically greater than MBR, but power consumption is a factor of bandwidth capability. For an example router (R1) having 8 flexible physical interface card (PIC) concentrators (FPCs), 54 ports per FPC, 432 total ports, 400 Gb/s (400G) maximum bandwidth per port, the MBC of R1 is 172.8 terabytes per second (TBps or T). Thus, the MBC (e.g., the power consumption at 100% bandwidth utilization) is approximately 20 kW.

The MBR of R1 is lower than the MBC of R1. For example, if 150 out of the 432 ports in use are configured for 100G (the ports may be configurable for 100G or 400G because many networks are transitioning from 100G to 400G), optics are not inserted into 30 out of the 432 ports (e.g., the 30 ports may be reserved for future expansion), and 5 out of the 432 ports are not configured with an interface (e.g., a logical unit), route, or the like (e.g., because the ports have not yet been provisioned), then the MBR for R1 in this deployment may be 66% of the MBC. For example, the quantity of 400G ports that can forward traffic is 247 (=432−150−30−5), the MBR for the 400G ports is 98.8 T (=400×97), the quantity of 100G ports that can forward traffic is 150, and the MBR for the 100G ports is 15 T. For example, if all of the traffic-capable interfaces and/or ports forward traffic at a 100% rate, then the MBR (e.g., the bandwidth utilization) for R1 may reach (98.8+15) T=113.8 T or 66% of the MBC. However, the power utilization for R1 is greater than 13.2 kW, which indicates that R1 is wasting power.

When processing line-rate traffic, a network device (e.g., R1) consumes maximum power. If that same network device does not consume significantly less power when processing a significantly lesser workload (e.g., if the power consumption of a network device is not proportional to the actual bandwidth requirement or traffic load), then that network device is wasting power.

For example, underutilized and unused interfaces (e.g., IFDs) may stay up for long periods of time (e.g., hours) and consume power. Fabric links (e.g., internal links between forwarding application-specific integrated circuits (ASICs) and fabric ASICs) may stay up when not necessary. Forwarding ASICs and fabric ASICs may continue to run and consume power when the forwarding ASICs and the fabric ASICs are not processing traffic, or when the traffic can avoid the forwarding ASICs and the fabric ASICs. Furthermore, hardware components (e.g., power supply modules (PSMs)) may run with sub-optimal efficiency. As a result, network devices are prone to performing power-inefficient routing.

Some implementations provided herein enable identifying power wastage points and dynamically preventing power wastage. In some aspects, a network device may determine an MBR associated with the network device and reduce a power level of a component (e.g., a field-replaceable unit (FRU)) of the network device based at least in part on the MBR. The network device may determine the MBR at various levels (e.g., the interface-level, the forwarding-ASIC-level, the fabric-ASIC-level, the chassis-level, or the like) and, in response, disable (e.g., power-off) various hardware components. The network device may also enable (e.g., power-on) various hardware components (e.g., when the MBR increases). Thus, power consumption may be controlled based at least in part on the MBR (e.g., using in-chassis, rule-based logic).

As a result, by reducing the power level of a component of the network device based at least in part on the MBR associated with the network device, the network device may provide end-to-end power optimization without impacting network topology, network/link redundancies, or high-availability scenarios. Reducing the power level based at least in part on the MBR may be an in-chassis based solution that is independent from an external control point (e.g., an element management system (EMS), a network management system (NMS), or the like). Implementations described herein may be implemented using software (e.g., rule-based software) without any changes to the hardware of the network device. Furthermore, enabling the various hardware components may provide fully revertive and automated operations.

FIG. 1 is a diagram of an example implementation 100 associated with reducing a power level of a component of a network device based at least in part on an MBR associated with the network device. As shown in FIG. 1, example implementation 100 includes an endpoint device, a network including a plurality of network devices, and a server device. These devices are described in more detail below in connection with FIGS. 3-5.

In some examples, the network device may be housed in a chassis. The network device may include ports (e.g., data ports) for receiving and directing data traffic. For example, the ports may be small form factor pluggable (SFP) ports (e.g., ports configured for SFP transceivers). One or more of the ports may be tied to a communications line, such as a fiber optic line. The ports may receive the data traffic from, and/or direct the data traffic to, a wide area network (WAN).

The network device may further include one or more cards (e.g., one or more physical interface cards (PICs), one or more line cards, or the like). In some examples, the network device may include one or more flexible PIC concentrators (FPCs). An FPC may be a component that includes one or more forwarding logic devices and multiple PICs. The one or more forwarding logic devices may include one or more central processing units (CPUs), one or more field-programmable gate arrays (FPGAs), one or more application-specific integrated circuits (ASICs) (e.g., one or more forwarding ASICs), or the like.

The network device may further include one or more boards (e.g., one or more switch interface boards (SIBs)), which may provide a switching fabric (e.g., a network topology of interconnected network nodes) for the network device. Each SIB may include at least one fabric logic device. A fabric logic device may include one or more CPUs, one or more FPGAs, one or more ASICs (e.g., fabric ASICs), or the like. The network device may further include one or more fabric links. A fabric link may be an internal link between a forwarding logic device and a fabric logic device.

The network device may further include a retimer, a serializer/deserializer (SerDes), a power supply module (PSM), and/or a gearbox. The retimer may synchronize a clock embedded in the data traffic with a clock on the network device, thereby maintaining signal strength. A SerDes typically includes a pair of functional blocks commonly used in high-speed communications to compensate for limited input/output. The SerDes can be an integrated circuit transceiver that converts parallel data to serial data and vice-versa. The PSM may be a hardware FRU configured to adjust the amount of power that a power supply provides to the network device. The gearbox may merge data traffic to be transmitted in one optical fiber and/or split data traffic received in one optical fiber.

As shown by reference number 110, the network device may determine (e.g., identify, compute, calculate, or the like) an MBR associated with the network device. As discussed in greater detail below with respect to FIGS. 2A-2C, the MBR may be associated with a forwarding logic device of the network device (e.g., a forwarding ASIC of the network device), one or more cards of the network device (e.g., an FPC, which may contain multiple PICs (e.g., cards)), a fabric logic device (e.g., a fabric ASIC), a board (e.g., a SIB), or the like.

As shown by reference number 120, the network device may reduce, based at least in part on the MBR, a power level of a component of the network device. For example, the network device may power off the component, which may further conserve power (e.g., compared to supplying partial power to the component). As discussed in greater detail below with respect to FIGS. 2A-2C, the network device may reduce, based at least in part on the MBR, the power level of (e.g., power-off) a fabric link, a forwarding logic device, one or more cards, a fabric logic device, a board, a retimer, a SerDes, a gearbox, or the like.

In one example, the network device may determine the MBR of each forwarding ASIC. The network device may power off a subset of fabric links (e.g., internal links between the forwarding ASICs and one or more fabric ASICs) to match the MBRs. The network device may power off the optics/SFPs of an interface if the interface is not configured (e.g., if the interface is not configured with an interface (e.g., a logical unit) or an address entity). The network entity may power off one or more of the forwarding ASICs when the MBRs of the one or more forwarding ASICs are zero. The network device may power off a SerDes (e.g., a WAN SerDes and/or a fabric SerDes), a retimer (e.g., a WAN retimer and/or a fabric retimer), and/or a gearbox (e.g., a WAN gearbox and/or a fabric gearbox) as applicable.

Additionally, or alternatively, the network device may determine the MBR for each fabric ASIC and power off any fabric ASICs having an MBR of zero. In some examples, the network device may determine the MBR for each FPC and SIB and power off any FPCs and/or SIBs having an MBR of zero. The network device may preserve an N:1 redundancy that is present in the network fabric. For example, the network device may avoid powering off a component that would cause the network fabric to lose the N:1 redundancy (e.g., if powering off the component would result in fewer redundancies).

In some examples, the network device may determine an updated MBR associated with the network device and increase, based at least in part on the updated MBR, the power level of the component of the network device (e.g., the network device may power on the component). In some examples, the updated MBR may be greater than the (previously determined) MBR. For instance, a user may configure an unused link, causing the MBR to increase and prompting the network device to increase the power level of the component. Increasing the power level of the component of the network device based at least in part on the updated MBR may enable the network device to revert (e.g., undo) all or a subset of power-conserving operations based on events that would prevent the network device from handling network traffic if the power-conserving operations were not reverted.

In some examples, a user may configure aspects of the implementations described herein. For example, the user may selectively enable and/or disable all or some power-saving features for various hardware components (e.g., links, devices, or the like). For example, the user may adjust a global setting (e.g., a global knob) and/or one or more component-specific settings (e.g., a per-component or per-link power optimization knob). The adjustable global setting may allow the user to enable implementations described herein (e.g., "enable-auto-power-optimization") for all components and/or to disable implementations described herein (e.g., "disable-auto-power-optimization") for all components. The component-specific settings may enable the user to enable or disable implementations described herein for specific components (e.g., "optics-power-optimization," "interface-power-optimization," "fabric-forwarding-link-power-optimization," "forwarding-power-optimization," "FPC-power-optimization," "SIB-power-optimization," or the like).

Reducing the power level of the component of the network device based at least in part on the MBR may enable power savings. The following example involving Tables 1-5 illustrates potential power savings for one chassis.

Table 1 below provides potential power savings achieved by powering off ports (e.g., IFDs/optics). Although not shown in Table 1, the network device may also power off at least one WAN SerDes and at least one WAN retimer, which may result in further power optimization.

TABLE 1

| Power consumed by each 400 G Optics | 20 W |
| Total number of 400 G ports per ASIC | 18 |
| Total number of ASICs per FPC | 3 |
| Total number of FPCs per chassis | 8 |
| Total number of optics per chassis | =18 × 3 × 18 = 432 |
| Total power consumed by optics | 8640 W (432 × 20) |
| Switch off 15% of the optics/ports | Savings of 1296 W |

Table 2 below provides potential power savings achieved by powering off fabric links (e.g., fabric-forwarding internal links).

TABLE 2

| Retimer | 15 W |
| SerDes | 2.5 W |
| Per forwarding-ASIC-SIB set of links | 17.5 W |
| One forwarding-ASIC-to-all-SIBs links | 140 W |
| All-forwarding-ASIC-to-all-SIBS (all-internal-links) | 3.36 kW |
| 25% of links power-off | Savings of 840 W |

Table 3 below provides potential power savings achieved by disabling forwarding ASICs. Table 3 includes a conservative estimate of 8% (e.g., as opposed to 25%, which is the percentage of fabric links that were powered off in the example of Table 2). The estimate is conservative because a forwarding ASIC may be powered off when every port/IFD associated with the forwarding ASIC is not configured, and unconfigured ports may be spread across various forwarding ASICs rather than concentrated at one or more specific forwarding ASICs.

TABLE 3

| Power consumed by each forwarding ASIC | 400 W |
| Total number of forwarding ASICs per FPC | 3 |
| Total number of FPCs per chassis | 8 |
| Total number of ASICs per chassis | =3 × 8 = 24 |
| Total power consumed by forwarding ASICs | 9600 W (24 × 400) |
| Switch off 8% of the ASICs (2 out of 24 ASICs) | Savings of 800 W |

Table 4 below provides potential power savings achieved by powering off fabric ASICs.

TABLE 4

| Power consumed by each fabric ASIC | 150 W |
| Total number of fabric ASICs per SIB | 3 |
| Total number of SIBs per chassis | 6 |
| Total number of ASICs per chassis | =3 × 6 = 18 |
| Total power consumed by fabric ASICs | 2700 W (18 × 150) |
| Switch off 11% of the ASICs (2 out of 18 ASICs) | Savings of 300 W |

Table 5 below provides potential total power savings based on the values provided in Tables 1-4.

TABLE 5

| Power-saving source | Savings (W) |
|---|---|
| Optics power off (15% of total optics) | 1296 |
| ASIC power off (8% of the ASICs) | 800 |
| Fabric-forwarding-ASIC internal link power off | 840 |
| SIB power off | 300 |
| Total power saving per chassis | 3236 |

As shown in Table 5, implementations described herein may result in power savings of 3 kW per chassis, which is a significant reduction in power. Because networks have many such network devices (e.g., routers), the total power savings may be greater than 3 kW. As a result, the operating expense and carbon footprint of the network may decrease significantly.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2A:
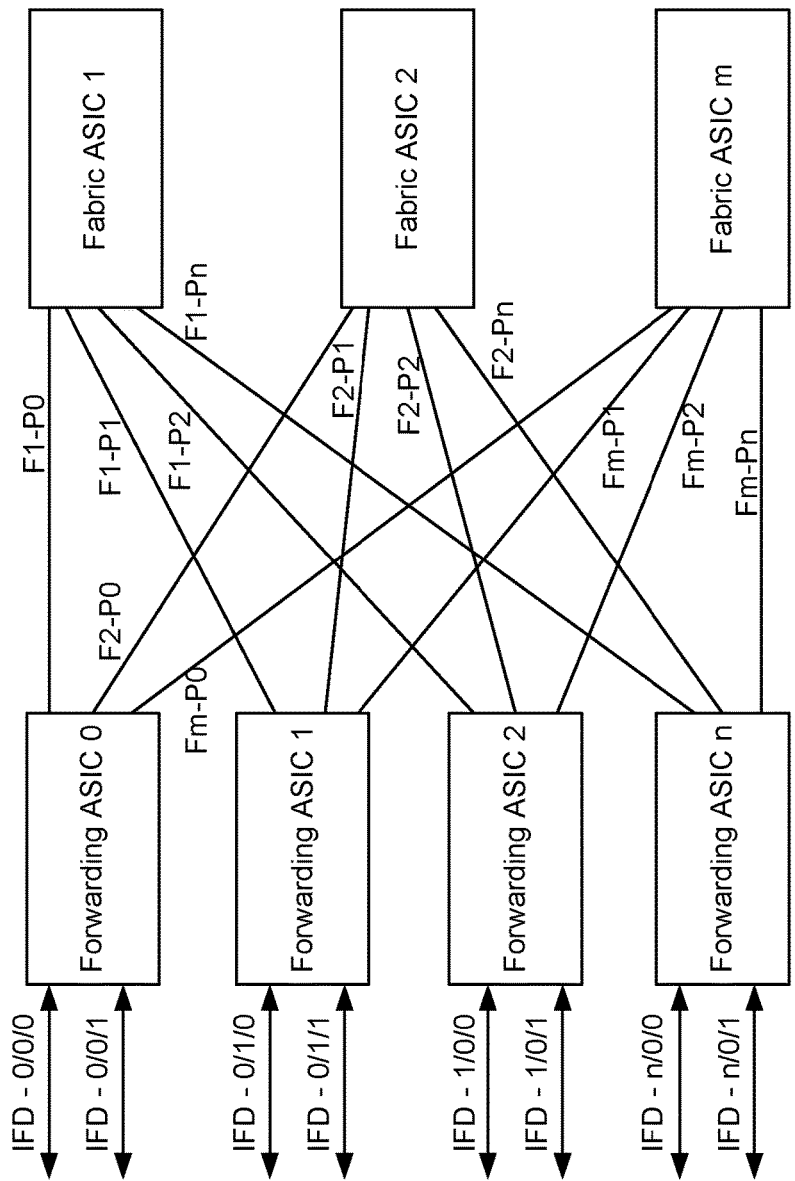
FIGS. 2A-2C are diagrams of an example implementation associated with MBR-based power level reduction.
Figure 2B:
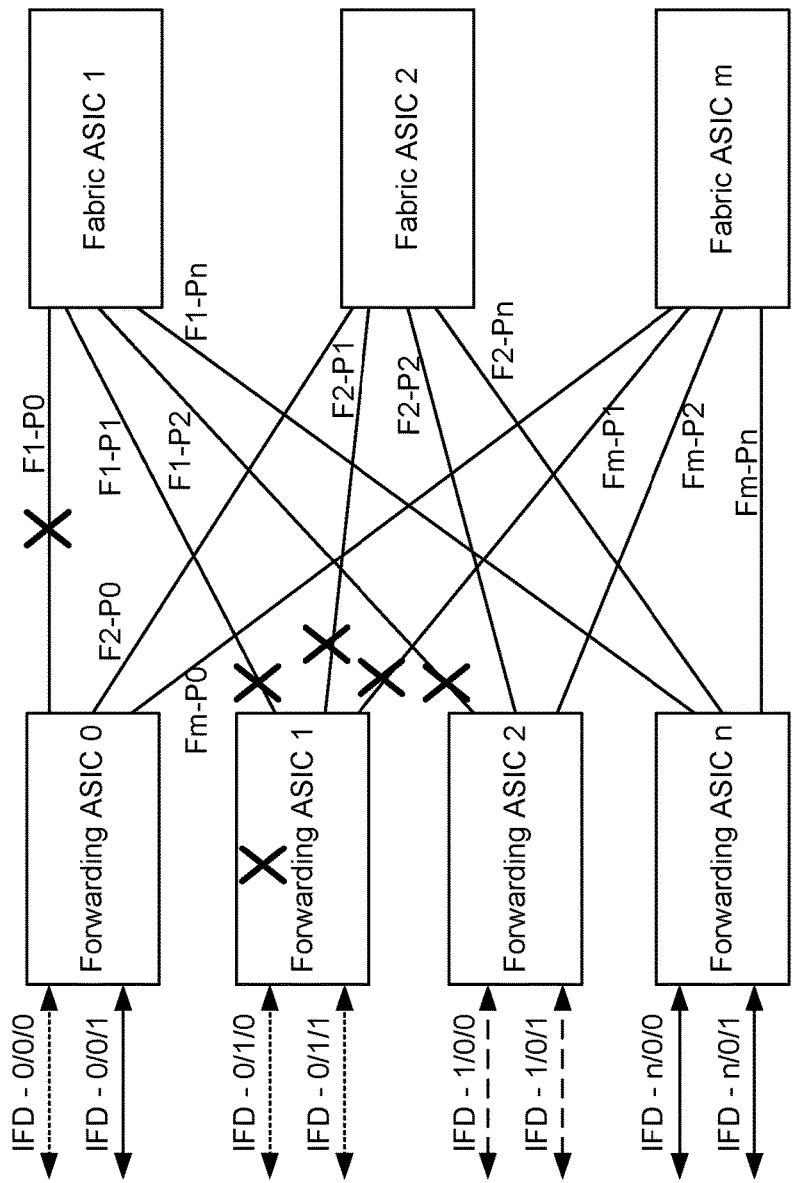
Figure 2C:
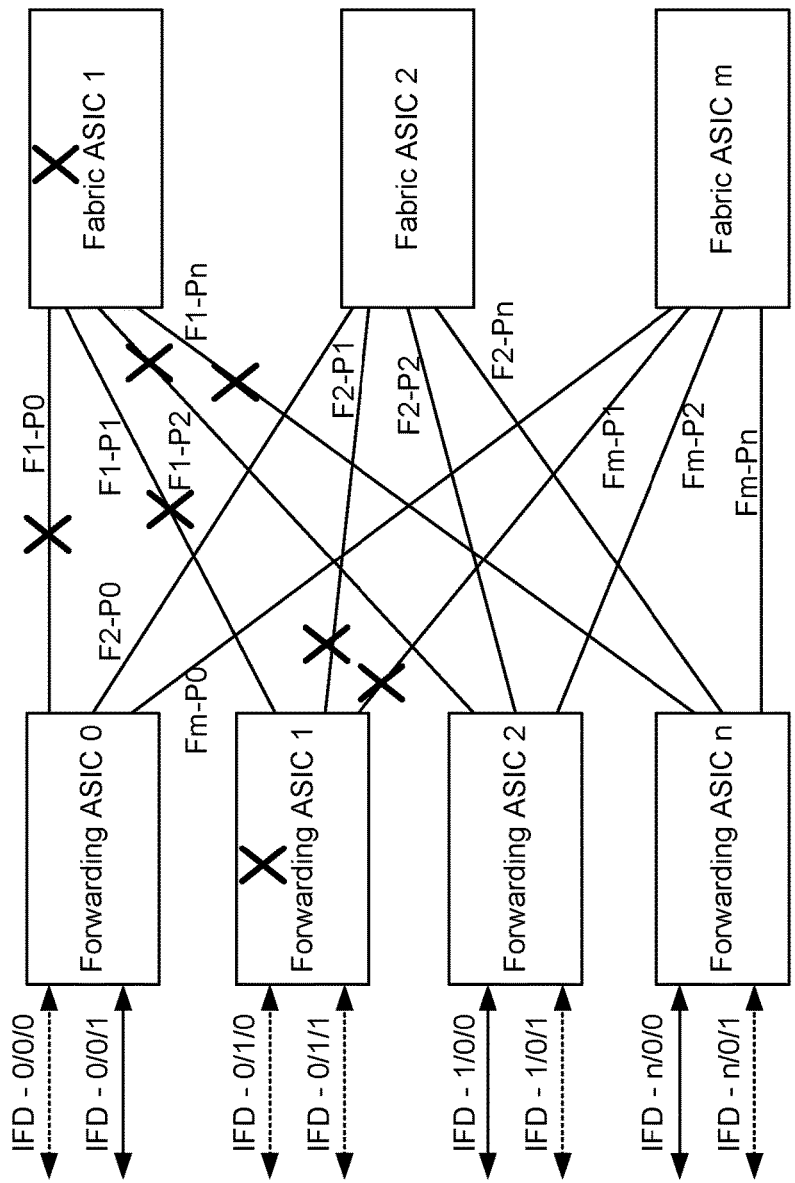

FIGS. 2A-2C are diagrams of an example implementation 200 associated with MBR-based power level reduction. Example implementation 200 illustrates various components of a chassis (e.g., a modular chassis), which may comprise a network device (e.g., a router).

With reference to FIG. 2A, shown is a chassis that includes N forwarding ASICs and M fabric ASICs. The chassis further includes external WAN links (e.g., WAN ports, such as IFD-0/0/0, IFD-0/0/1, etc.) and internal fabric links (e.g., F1-P0, F2-P0, etc.). The fabric links may route traffic between forwarding ASICs via at least one fabric ASIC. For example, if a packet ingresses the chassis via IFD-0/0/1 (forwarding ASIC 0) and is to egress the chassis via IFD-1/0/0 (forwarding ASIC 2), then the packet may travel over the fabric links, via one of the fabric ASICs, to reach IFD-1/0/0.

In this example, all WAN links are 400G, N=100, M=32, and the total quantity of IFDs is 200. Thus, the MBC of each forwarding ASIC is 800G, and the MBC of the chassis is 800T. While bandwidth utilization of the chassis is less than 800T, components of the chassis are powered-on as if the bandwidth utilization was 800T (e.g., based on the MBC). For example, all internal fabric links may be running and consuming power, regardless of the status and/or speed of the WAN links. Additionally, or alternatively, unconfigured optics may be powered-up and consuming power. Additionally, or alternatively, unused forwarding ASICs and/or fabric ASICs may be powered-up and consuming power. These components (e.g., one or more internal fabric links, unconfigured optics, unused forwarding ASICs, fabric ASICs, or the like) may contribute to power wastage.

With reference to FIG. 2B, several examples are provided that may enable power reduction in accordance with aspects described herein. In a first example, the network device may determine the MBR of a forwarding logic device (e.g., forwarding ASIC 0). For example, IFD-0/0/0 may have no configuration, as represented by the dotted line corresponding to IFD-0/0/0. Because forwarding ASIC 0 has two associated WAN links (IFD-0/0/0 and IFD-0/0/1), and IFD-0/0/0 is not configured, the forwarding ASIC 0 may experience up to 50% of the MBC of the forwarding ASIC 0. Thus, based on the actual status and/or speed of the ports/IFDs, the network device may determine that the MBR associated with forwarding ASIC 0 (e.g., a forwarding logic device) is 400G. Determining an MBR associated with a forwarding logic device of the network device may enable the network device to reduce power consumption based on the MBR of the forwarding logic device.

Based at least in part on the MBR associated with the forwarding logic device (e.g., forwarding ASIC 0), the network device may reduce a power level of a fabric link. For example, the network device may power-off the F1-P0 link without impacting data traffic because forwarding ASIC 0 would handle at most 400G (e.g., rather than 800G). Reducing the power level of the fabric link may reduce the power consumption attributable to the fabric link.

Additionally, or alternatively, the network device may determine that a port is unused and, reduce, based at least in part on determining that the port is unused, a power level of the port. The network device may determine that the port is unused by determining that the port is not configured, has no corresponding SFP, or the like. For example, the network device may determine that IFD-0/0/0 is not configured and reduce a power level of the port (e.g., WAN optics) associated with IFD-0/0/0. For example, the network device may power off the port. Reducing the power level of the port may reduce the power consumption attributable to the port.

Additionally, or alternatively, the network device may reduce a power level of (e.g., power off) one or more of a retimer, a serializer or a deserializer (e.g., a SerDes), a PSM, a gearbox, or the like. In some examples, the network device may reduce the power level of the F1-P0 link and reduce the power level of one or more components (e.g., a retimer, a SerDes, a gearbox, or the like) associated with the F1-P0 link. In some examples, the network device may switch off the PSM when the power requirements of the system (e.g., the chassis and/or network device) are low. Reducing the power level of the retimer, the SerDes, the PSM, and/or the gearbox may reduce the power consumption attributable to the retimer, the SerDes, the PSM, and/or the gearbox.

In a second example, the network device may reduce a power level of (e.g., power off) a forwarding logic device (e.g., forwarding ASIC 1) based at least in part on an MBR associated with the forwarding logic device. For example, IFD-0/1/0 and IFD-0/1/1 have no corresponding optics/SFPs, as represented by the dotted lines corresponding to IFD-0/1/0 and IFD-0/1/1. Because forwarding ASIC 1 has two associated WAN links (IFD-0/1/0 and IFD-0/1/1), and neither WAN link is used (e.g., neither WAN link has corresponding optics/SFP), the network device may determine that the MBR of the forwarding ASIC 1 may be zero bytes (0%). Therefore, because forwarding ASIC 1 cannot send or receive any traffic via IFD-0/1/0 or IFD-0/1/1, the network device may reduce a power level of (e.g., power off) forwarding ASIC 1. Reducing the power level of the forwarding logic device (e.g., forwarding ASIC 1) may reduce the power consumption attributable to the forwarding logic device.

Additionally, or alternatively, the network device may reduce power levels of (e.g., power off) fabric links associated with the forwarding logic device. For example, in response to powering off the forwarding ASIC 1, the network device may reduce power levels of fabric links that are designed to carry traffic to or from forwarding ASIC 1 (e.g., F1-P1, F2-P1, . . . , Fm-P1). Reducing the power levels of the fabric links may not impact data traffic because the fabric links cannot carry traffic to or from forwarding ASIC 1. Reducing the power level of the fabric links associated with the forwarding logic device may reduce the power consumption attributable to the fabric links.

The network device may determine an MBR associated with one or more cards (e.g., an MBR associated with an FPC) and, based at least in part on the MBR, reduce a power level of (e.g., power off) the FPC. For example, if an FPC includes two forwarding ASICs (e.g., only forwarding ASIC 0 and forwarding ASIC 1), and the network device reduces a power level of forwarding ASIC 0 and a power level of forwarding ASIC 1, then the network device may also reduce the power level of FPC without impacting data traffic. Reducing the power level of the FPC may reduce the power consumption attributable to the FPC.

The network device may power off the FPC when the MBR associated with the FPC is (e.g., decreases to) zero.

Additionally, or alternatively, as explained in greater detail below with respect to FIG. 2C, the network device may power off one or more fabric ASICs and/or one or more SIBs when the MBR(s) associated with the fabric ASIC(s) and/or the SIB(s) are (e.g., decrease to) zero.

In a third example, IFD-1/0/0 and IFD-1/0/1 may be configured for 100G (although IFD-1/0/0 and IFD-1/0/1 may be capable of supporting 400G), as represented by the dashed lines corresponding to the IFD-1/0/0 and IFD-1/0/1. As a result, the network device may determine that the MBR of forwarding ASIC 2 is 200G (e.g., 25% of the MBC). The network device may reduce power to (e.g., power off) the F1-P2 link without impacting the data traffic because the other fabric links associated with forwarding ASIC 2 (e.g., F2-P2 . . . Fm-P2) may support the current MBR of 200G.

With reference to FIG. 2C, shown is a further example that may enable power reduction in accordance with aspects described herein. IFD-0/0/0, IFD-0/1/0, and IFD-0/1/1 are unused (e.g., not configured or without SFPs), as represented by the dotted lines corresponding to IFD-0/0/0, IFD-0/1/0, and IFD-0/1/1 and as discussed above in relation to FIG. 2B. As described above in connection with FIG. 2B, the network device may have reduced a power level of various components. For example, the network device may have powered off the F1-P0 link, forwarding ASIC 1, the F1-P1, F2-P1, . . . Fm-P1 links, or the like.

In the example of FIG. 2C, IFD-1/0/1 . . . IFD-n/0/1 may also be unused, as represented by the dotted lines corresponding to IFD-1/0/1 . . . IFD-n/0/1. As a result, the network device may determine that the MBRs associated with forwarding ASIC 2 . . . forwarding ASIC N have decreased to 50%. Thus, the network device may reduce power levels of (e.g., power off) fabric links F1-P2 . . . F1-Pn.

In some examples, the network device may determine an MBR associated with a fabric logic device (e.g., a fabric ASIC 1) and, based at least in part on the MBR, reduce a power level of the fabric logic device. For example, the network device may determine that the MBR of fabric ASIC 1 is zero. The MBR may be zero because every internal link connected to fabric ASIC 1 is powered-off. Therefore, the network device may reduce the power level of fabric ASIC 1 (e.g., the network device may power off fabric ASIC 1). Reducing the power level of the fabric logic device may reduce the power consumption attributable to the fabric logic device.

The network device may select, from a plurality of candidate fabric links, one or more fabric links associated with the fabric logic device and reduce one or more power levels of the one or more fabric links. For example, the network device may select links associated with fabric ASIC 1. Based on IFD-1/0/1 becoming unused, the network device may select, from among candidate fabric links F1-P2, F2-P2, . . . , Fm-P2, F1-P2 (which is connected to fabric ASIC 1). Based on IFD-n/0/1 becoming unused, the network device may further select, from among candidate fabric links F1-Pn, F2-Pn, . . . , Fm-Pn, F1-Pn (which is also connected to fabric ASIC 1). By selecting the one or more fabric links associated with the fabric logic device (e.g., rather than randomly powering off internal fabric links), the network device may enable, or expedite, reduction of a power level on a given fabric ASIC without impacting data traffic.

In some examples, the network device may determine an MBR associated with a board that includes at least one fabric logic device (e.g., a SIB) and, based at least in part on the MBR, reduce a power level of the board. For example, if a SIB includes two fabric ASICs (e.g., only fabric ASIC 1 and fabric ASIC 2), and the network device reduces a power level of fabric ASIC 1 and fabric ASIC 2, then the network device may also reduce the power level of the SIB without impacting with data traffic. Reducing the power level of the board may reduce the power consumption attributable to the board.

The network device may select, from a plurality of candidate fabric logic devices, one or more fabric logic devices associated with the board and reduce one or more power levels of the one or more fabric logic devices. For example, the network device may select fabric logic devices associated with the SIB (e.g., fabric ASIC 1 and fabric ASIC 2). For example, the network device may, over time, power off fabric links associated with fabric ASIC 1 and fabric links associated with fabric ASIC 2. After all fabric links connected to fabric ASIC 1 and all fabric links connected to fabric ASIC 2 have been powered off, the network device may power off the SIB. By selecting the one or more fabric logic devices associated with the board (e.g., rather than randomly powering off fabric logic devices), the network device may enable, or expedite, reduction of a power level on a given board without impacting data traffic.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
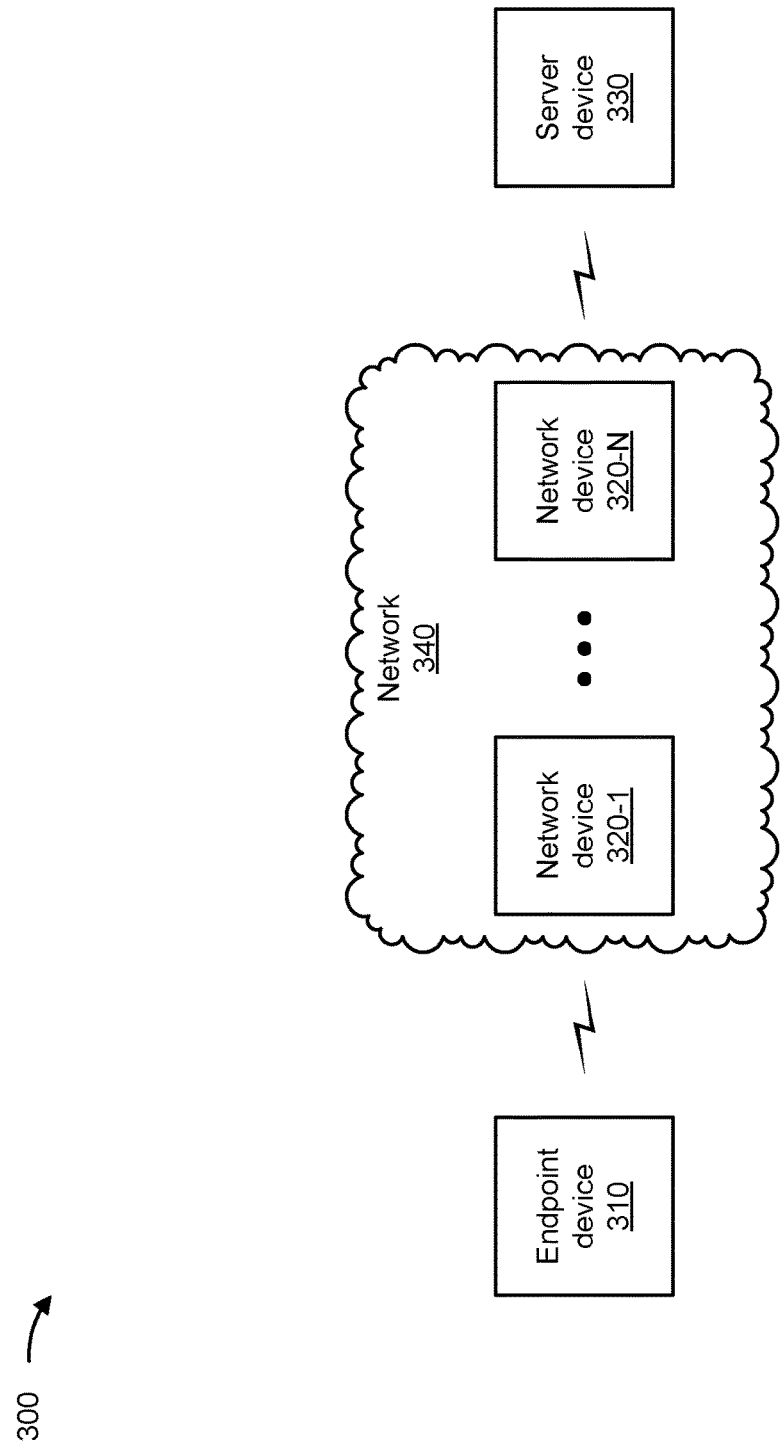
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an endpoint device 310, a group of network devices 320 (shown as network device 320-1 through network device 320-N), a server device 330, and a network 340. Devices of environment 300 may interconnect via wired connections, wireless connections, or a combination of wired and wireless connections.

Endpoint device 310 includes one or more devices capable of receiving, generating, storing, processing, and/or providing information, such as information described herein. For example, endpoint device 310 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 310 may receive network traffic from and/or may provide network traffic to other endpoint devices 310 and/or server device 330, via network 340 (e.g., by routing packets using network devices 320 as intermediaries).

Network device 320 includes one or more devices capable of receiving, processing, storing, routing, and/or providing traffic (e.g., a packet or other information or metadata) in a manner described herein. For example, network device 320 may include a router, such as a label switching router (LSR), a label edge router (LER), an ingress router, an egress router, a provider router (e.g., a provider edge router or a provider core router), a virtual router, or another type of router. Additionally, or alternatively, network device 320 may include a gateway, a switch, a firewall, a hub, a bridge, a reverse proxy, a server (e.g., a proxy server, a cloud server, or a data center server), a load balancer, and/or a similar device. In some implementations, network device 320 may be a physical device implemented within a housing, such as a chassis. In some implementations, network device 320 may be a virtual device implemented by one or more computer devices of a cloud computing environment or a data center. In some implementations, a group of network devices 320 may be a group of data center nodes that are used to route traffic flow through network 340.

Server device 330 includes one or more devices capable of receiving, generating, storing, processing, and/or providing information, such as information described herein. For example, server device 330 may include a laptop computer, a tablet computer, a desktop computer, a group of server devices, or a similar type of device, associated with multicast traffic. In some implementations, server device 330 may receive information from and/or transmit information (e.g., multicast traffic) to endpoint device 310, via network 340 (e.g., by routing packets using network devices 320 as intermediaries).

Network 340 includes one or more wired and/or wireless networks. For example, network 340 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
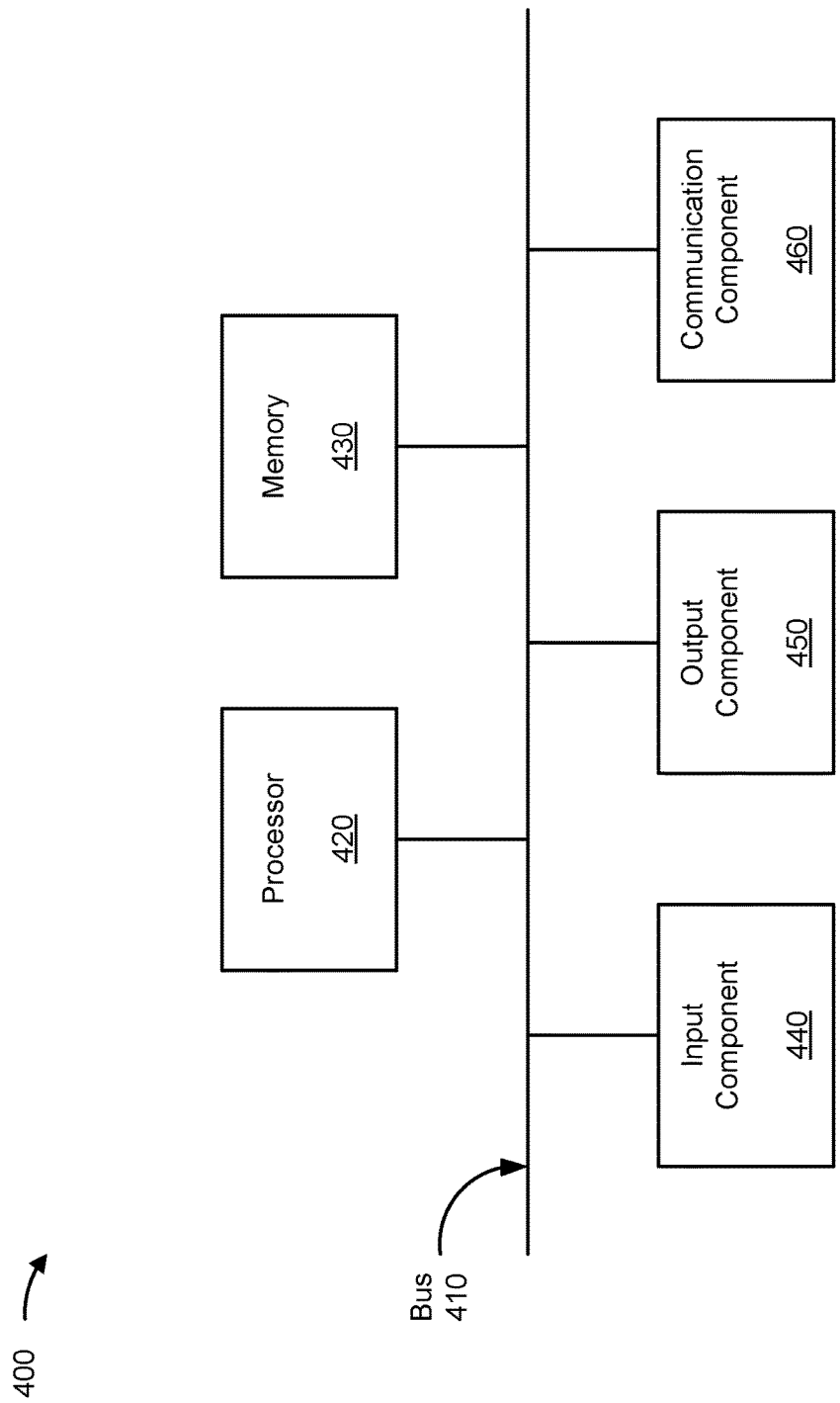
FIG. 4 is a diagram of example components of a device associated with reducing a power level of a component of a network device based at least in part on an MBR associated with the network device.

FIG. 4 is a diagram of example components of a device 400 associated with reducing a power level of a component of a network device based at least in part on an MBR associated with the network device. The device 400 may correspond to network device 320. In some implementations, network device 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
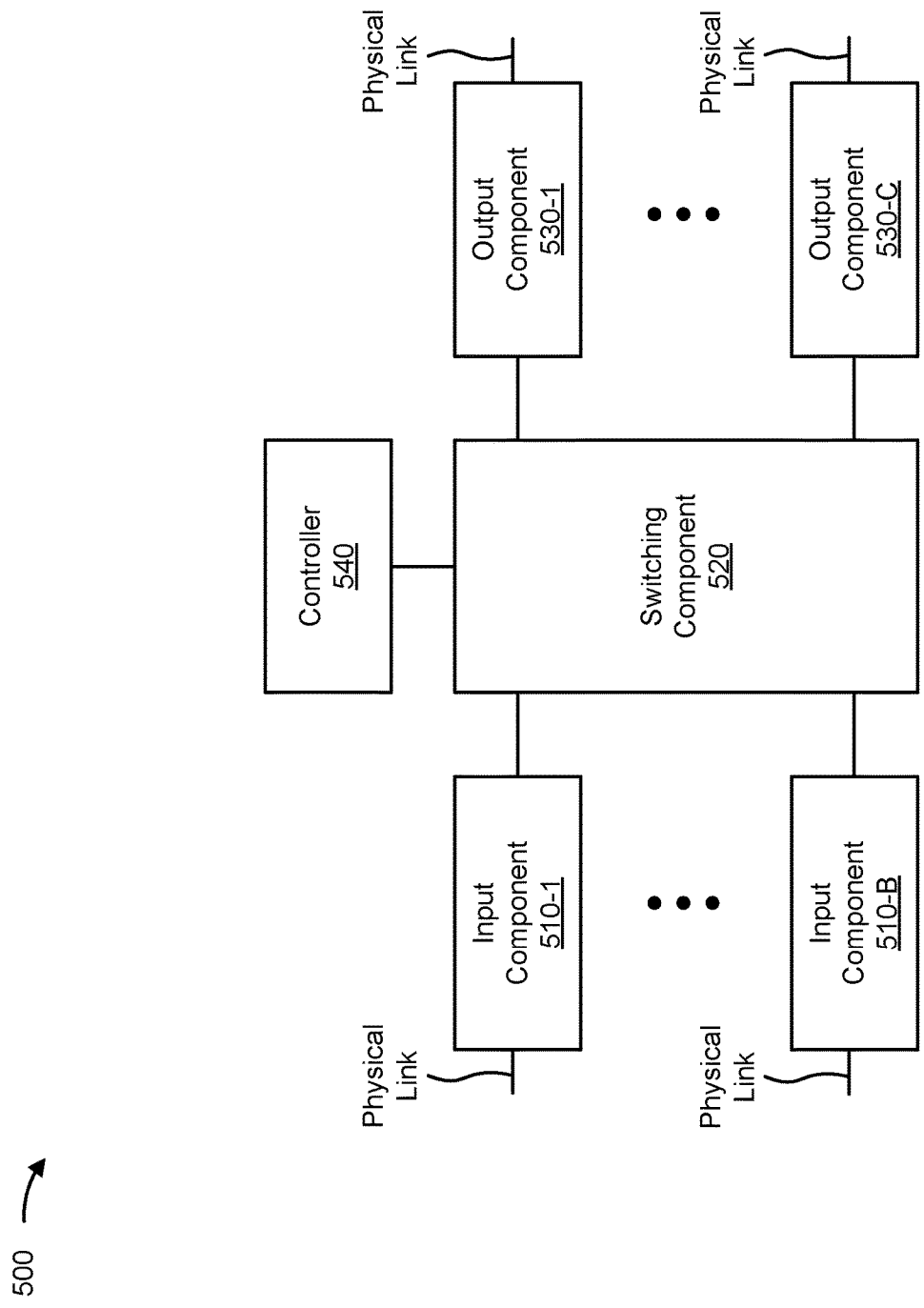
FIG. 5 is a diagram of example components of a device associated with reducing a power level of a component of a network device based at least in part on an MBR associated with the network device.

FIG. 5 is a diagram of example components of a device 500 associated with reducing a power level of a component of a network device based at least in part on an MBR associated with the network device. Device 500 may correspond to network device 320 and/or device 400. In some implementations, network device 320 and/or device 400 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a graphics processing unit (GPU), an accelerated processing unit (APU), a microprocessor, a microcontroller, a digital signal processor (DSP), an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
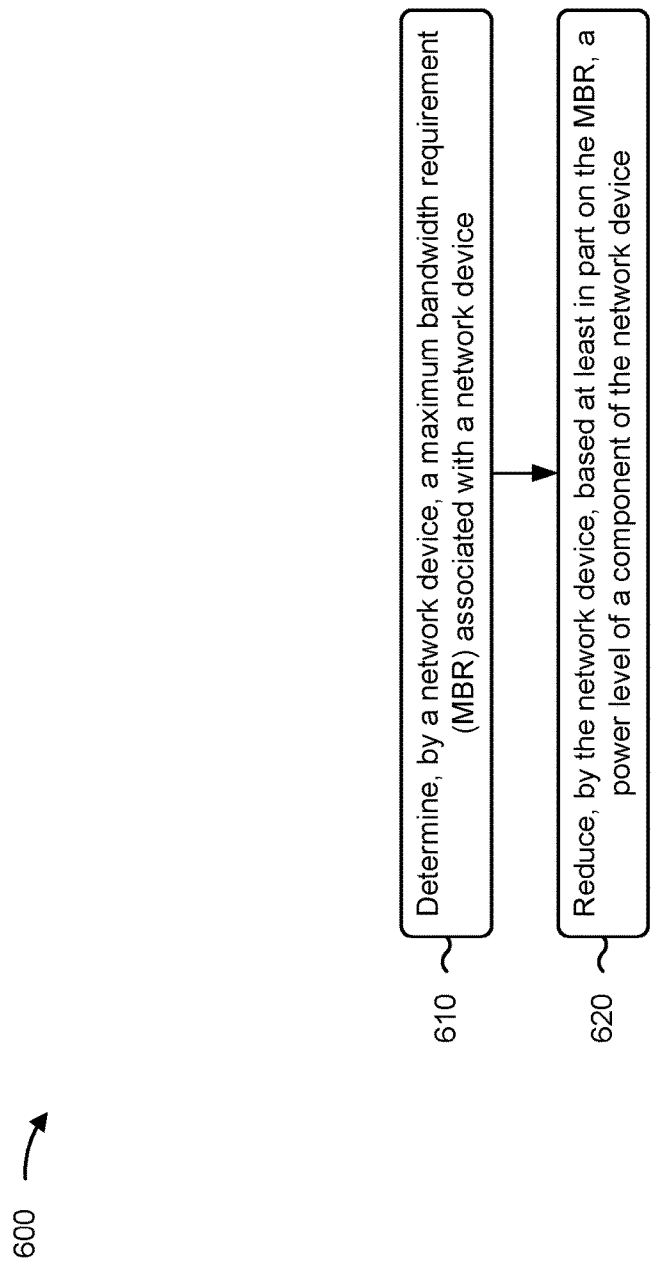
FIG. 6 is a flowchart of an example process associated with power level reduction based on an MBR.

FIG. 6 is a flowchart of an example process 600 associated with power level reduction based on an MBR. In some implementations, one or more process blocks of FIG. 6 are performed by a network device (e.g., network device 320). Additionally, or alternatively, one or more process blocks of FIG. 6 may be performed by one or more components of device 400, such as processor 420, memory 430, input component 440, output component 450, and/or communication component 460, and/or device 500, such as input component 510, switching component 520, output component 530, and/or controller 540.

As shown in FIG. 6, process 600 may include determining an MBR associated with a network device (block 610). For example, the network device may determine an MBR associated with a network device, as described above.

As further shown in FIG. 6, process 600 may include reducing, based at least in part on the MBR, a power level of a component of the network device (block 620). For example, the network device may reduce based at least in part on the MBR, a power level of a component of the network device, as described above.

Process 600 may include additional implementations, such as any single implementation or any combination of implementations described below and/or in connection with one or more other processes described elsewhere herein.

In a first implementation, determining the MBR includes determining the MBR based at least in part on a dynamic state of the network device.

In a second implementation, alone or in combination with the first implementation, reducing the power level of the component includes powering off the component.

In a third implementation, alone or in combination with one or more of the first and second implementations, process 600 includes determining, by the network device, an updated MBR associated with the network device, and increasing, by the network device, based at least in part on the updated MBR, the power level of the component of the network device.

In a fourth implementation, alone or in combination with one or more of the first through third implementations, the MBR is associated with a forwarding logic device of the network device.

In a fifth implementation, alone or in combination with one or more of the first through fourth implementations, the component is a fabric link of the network device.

In a sixth implementation, alone or in combination with one or more of the first through fifth implementations, the component is the forwarding logic device.

In a seventh implementation, alone or in combination with one or more of the first through sixth implementations, process 600 includes reducing, by the network device, power levels of fabric links associated with the forwarding logic device.

In an eighth implementation, alone or in combination with one or more of the first through seventh implementations, the MBR is associated with one or more cards of the network device, and the component includes the one or more cards.

In a ninth implementation, alone or in combination with one or more of the first through eighth implementations, the MBR is associated with a fabric logic device, and the component is the fabric logic device.

In a tenth implementation, alone or in combination with one or more of the first through ninth implementations, process 600 includes selecting, by the network device, from a plurality of candidate fabric links, one or more fabric links associated with the fabric logic device, and reducing, by the network device, one or more power levels of the one or more fabric links.

In an eleventh implementation, alone or in combination with one or more of the first through tenth implementations, the MBR is associated with a board that includes at least one fabric logic device, and the component is the board.

In a twelfth implementation, alone or in combination with one or more of the first through eleventh implementations, process 600 includes selecting, by the network device, from a plurality of candidate fabric logic devices, one or more fabric logic devices included on the board, the one or more fabric logic devices include the at least one fabric logic device, and process 600 further includes reducing, by the network device, one or more power levels of the one or more fabric logic devices.

In a thirteenth implementation, alone or in combination with one or more of the first through twelfth implementations, process 600 includes determining, by the network device, that a port of the network device is unused, and reducing, by the network device, based at least in part on determining that the port is unused, a power level of the port.

In a fourteenth implementation, alone or in combination with one or more of the first through thirteenth implementations, process 600 includes reducing, by the network device, a power level of retimer of the network device.

In a fifteenth implementation, alone or in combination with one or more of the first through fourteenth implementations, process 600 includes reducing, by the network device, a power level of one or more of a serializer or a deserializer of the network device.

In a sixteenth implementation, alone or in combination with one or more of the first through fifteenth implementations, process 600 includes reducing, by the network device, a power level of a power supply module of the network device.

In a seventeenth implementation, alone or in combination with one or more of the first through sixteenth implementations, process 600 includes reducing, by the network device, a power level of gearbox of the network device.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a network device and based on a status or speed of an interface device (IFD) of the network device, an initial maximum bandwidth requirement (MBR) associated with the network device;
    reducing, by the network device, a power level of the network device to be proportional to the initial MBR by powering off one or more components of the network device;
    determining, by the network device and based on a configuration of an unused link of the network device, an updated MBR associated with the network device,
        wherein the updated MBR is greater than the initial MBR; and
    increasing, by the network device and based on the updated MBR, the power level of the network device.

2. The method of claim 1, wherein determining the initial MBR is further based on a dynamic state of the network device.

3. The method of claim 1,
    wherein
    the power level of the network device is increased by powering on one or more components of the network device.

4. The method of claim 1, wherein the initial MBR is associated with a forwarding logic device of the network device.

5. The method of claim 4, wherein the one or more components include a fabric link of the network device.

6. The method of claim 4, wherein the one or more components include the forwarding logic device.

7. The method of claim 6, wherein the one or more components further include fabric links associated with the forwarding logic device.

8. The method of claim 1, wherein the initial MBR is associated with one or more cards of the network device, and wherein the one or more components include the one or more cards.

9. The method of claim 1, wherein the status of the IFD is one of:
    an unconfigured status, or
    an unused status.

10. A network device, comprising:
    one or more memories; and
    one or more processors to:
        determine, based on a status or speed of an interface device (IFD) of the network device, an initial maximum bandwidth requirement (MBR) associated with the network device;
        reduce a power level of the network device to be proportional to the initial MBR by powering off one or more components of the network device;
        determine, based on a configuration of an unused link of the network device, an updated MBR associated with the network device,
            wherein the updated MBR is greater than the initial MBR; and
        increase, based on the updated MBR, the power level of the network device.

11. The network device of claim 10, wherein the initial MBR is associated with a fabric logic device, and wherein the one or more components include the fabric logic device.

12. The network device of claim 11, wherein the one or more processors are further to:
    select, from a plurality of candidate fabric links, one or more fabric links associated with the fabric logic device,
        wherein the one or more components include the one or more fabric links.

13. The network device of claim 10, wherein the initial MBR is associated with a board that includes at least one fabric logic device, and wherein the one or more components include the board.

14. The network device of claim 10, wherein the one or more processors are further to:
    select, from a plurality of candidate fabric logic devices, one or more fabric logic devices included on a board,
        wherein the one or more components include the one or more fabric logic devices.

15. A non-transitory computer-readable medium storing a set of instructions, the set of instructions comprising:
    one or more instructions that, when executed by one or more processors of a network device, cause the network device to:
        determine, based on a status or speed of an interface device (IFD) of the network device, an initial maximum bandwidth requirement (MBR) associated with the network device;
        reduce a power level of the network device to be proportional to the MBR by powering off one or more components of the network device;
        determine, based on a configuration of an unused link of the network device, an updated MBR associated with the network device,
            wherein the updated MBR is greater than the initial MBR; and
        increase, based on the updated MBR, the power level of the network device.

16. The non-transitory computer-readable medium of claim 15, wherein the one or more instructions, when executed by the one or more processors, further cause the network device to:
    determine that the IFD of the network device is unused; and
    reduce the power level of the network device based on determining that the IFD is unused,
        wherein the one or more components include the IFD.

17. The non-transitory computer-readable medium of claim 15, wherein the one or more components include a retimer of the network device.

18. The non-transitory computer-readable medium of claim 15, wherein the one or more components include one or more of a serializer or a deserializer of the network device.

19. The non-transitory computer-readable medium of claim 15, wherein the one or more components include a power supply module of the network device.

20. The non-transitory computer-readable medium of claim 15, wherein the one or more components include a gearbox of the network device.

\* \* \* \* \*